J. M. DENNING.
STEERING MECHANISM.
APPLICATION FILED MAR. 23, 1916.
1,250,813.
Patented Dec. 18, 1917.
2 SHEETS—SHEET 2.
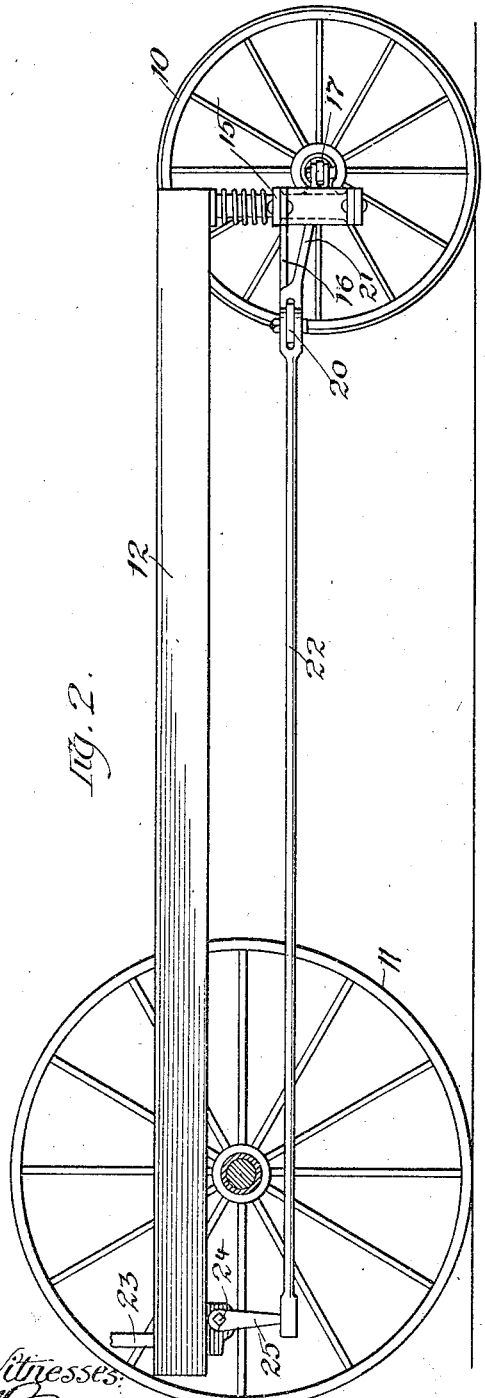
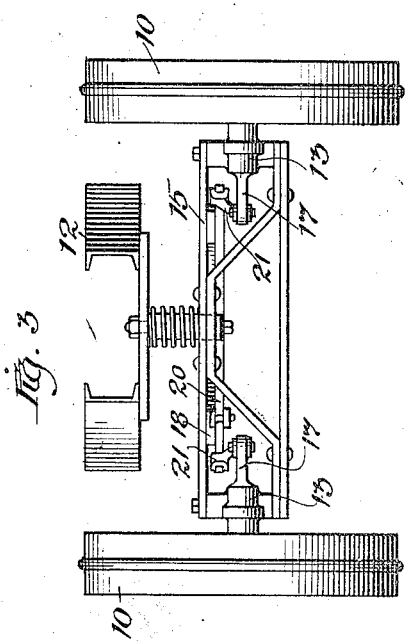
Witnesses:
Inventor:
Joseph M. Denning

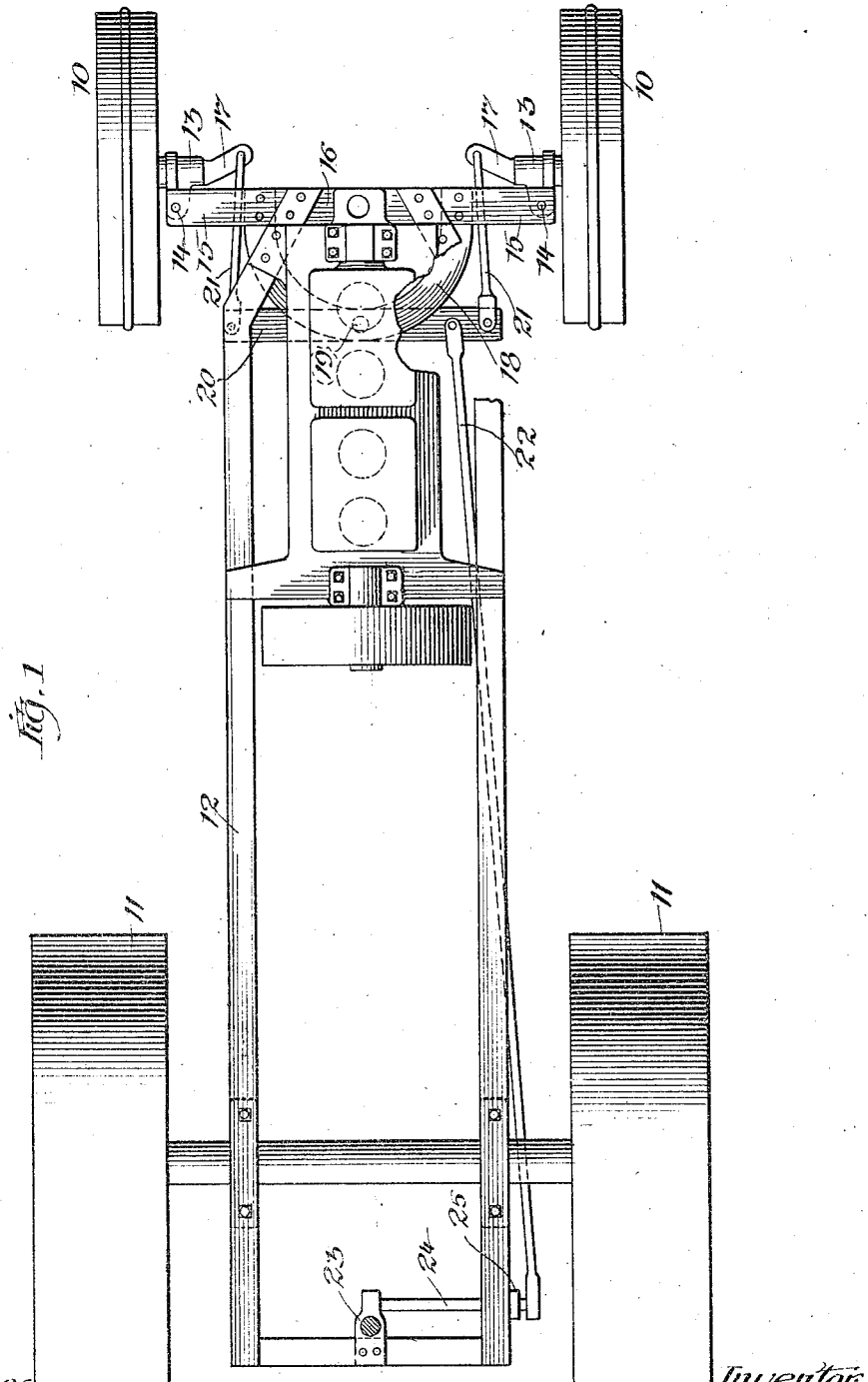

UNITED STATES PATENT OFFICE.

JOSEPH M. DENNING, OF CEDAR RAPIDS, IOWA.

STEERING MECHANISM.

1,250,813.      Specification of Letters Patent.      Patented Dec. 18, 1917.

Original application filed September 4, 1915, Serial No. 49,099. Divided and this application filed March 23, 1916. Serial No. 86,084.

*To all whom it may concern:*

Be it known that I, JOSEPH M. DENNING, a citizen of the United States, residing at Cedar Rapids, in the county of Linn and State of Iowa, have invented certain new and useful Improvements in Steering Mechanism, of which the following is a specification.

This application is a division of original application Serial No. 49099, and relates more particularly to the steering mechanism, particularly adapted for use with tractors and one of the objects of the invention is to provide improved mechanism of this character whereby the wheels may turn on a very short or sharp angle.

To the attainment of these ends and the accomplishment of other new and useful objects as will appear, the invention consists in the features of novelty in substantially the construction, combination and arrangement of the several parts hereinafter more fully described and claimed, and shown in the accompanying drawings illustrating the invention and in which—

Figure 1 is a top plan view of a chassis of a vehicle having steering mechanism applied thereto, and constructed in accordance with the principles of this invention.

Fig. 2 is a side elevation of the parts shown in Fig. 1.

Fig. 3 is a front elevation of the front of the vehicle showing the steering wheels.

Referring more particularly to the drawings, the numeral 10 designates the steering wheels and 11 the traction wheels connected with the vehicle frame 12. The steering wheels 10 are pivotally connected with the forward end of the supporting structure preferably by means of bearings 13, in which the axles of the wheels rotate, and these bearings 13 are pivotally connected as at 14 preferably to the extensions 15 on the front bar 16, so that the bearings will move on upright pivots. The bearings are provided with extensions 17, which are preferably bent forwardly with respect to the bearing and to the wheels.

Pivotally connected to a member 18, secured to the main frame and intermediate its ends as at 19 is a bar or rod 20, which is arranged parallel with the bar 16, and connected with this bar 20 and each of the extensions 17 is a link 21, each link being pivotally connected to the respective extensions 17 and the bar 20.

When the bar 20 is moved about its pivot, preferably by means of a rod 22, which is connected thereto, the wheels 10 will be moved about their pivots.

For steering the machine and by the provision of the forwardly bent portions 17, it is possible to give a shorter angle to the wheel taking the inside circle when turning on an angle, than it was possible to do heretofore. These wheels when straight are brought on the same forward line, but when turned to the left or to the right, the wheel taking the inside circle makes a shorter angle than the other wheel, due to the fact that the inside wheel turns on a shorter radius.

Heretofore the common practice of construction of the steering mechanism consists in extending an arm backward or forward from each wheel knuckle and connecting the two together by a rod, but should this means be applied to the present invention and the wheels turned at such an abrupt angle as is done in the present construction, the parts of the rod connection would assume positions practically on the center line with the pivotal parts of the knuckles and would lock so that the wheels could not be brought back into position.

In the present invention, the connection with the wheels between the pivot 14 and the pivot 19, is in the nature of a toggle lever, so that the outer ends of the pivotal bar when swung out of a center line, will swing toward the center of the axle and thus carry the end of the connecting rods in toward the center of the axles so that in drawing the wheels back straight, the pull will be on a more direct right angle line with the inner end of the axle spindle, without pulling against the axis of the axle, as would be the case if the rods were on a straight line in the machine and also because the rod pulls practically sidewise rather than pull back on a substantially straight line with the machine.

The rod 22 may be shifted in any suitable manner, preferably from a steering post 23, arranged in a convenient position for the operator, and which post is connected in any suitable manner, such as by means of a worm gear connection, (not shown), with a rock shaft 24, and to which shaft is connected an arm 25 which in turn is connected with the rod 22.

Thus it will be seen that the front wheels may be given a short turn and that it will be impossible, no matter at what angle the wheels are turned with respect to the supporting structure, to lock the shifting mechanism.

What is claimed as new is:—

1. Steering mechanism embodying steering wheels mounted to swing about separate upright pivots, axles about which the wheels rotate, the inner ends of the axles terminating short of each other and deflected forwardly, said ends being free from a direct connection therebetween, links connected with said deflected portions and extending rearwardly of the axles, a pivotally supported member to which the links are connected on opposite sides of its pivot, and means for swinging said member about its pivot.

2. Steering mechanism embodying steering wheels mounted to swing about separate upright pivots, axles about which the wheels rotate, the inner ends of the axles terminating short of each other and deflecting forwardly, said ends being free from a direct connection therebetween, links connected with said deflected portions and extending rearwardly of the axles, a pivotally supported member to which the links are connected on opposite sides of its pivot, a rod connected with the said member to swing the latter about its pivot, and a steering post operatively connected with the rod for shifting the same.

3. Steering mechanism embodying steering wheels mounted to swing about separate upright pivots, bearings for the wheels, forwardly projecting extensions connected with the bearings, extending toward and terminating short of each other, said extensions being free from a direct connection therebetween, a member disposed in the rear of the bearings and supported intermediate its ends to move about an upright pivot, a link pivotally connected with each of the said extensions and also with the said member, and means for swinging the said member about its pivot.

4. Steering mechanism embodying steering wheels mounted to swing about separate upright pivots, axles about which the wheels rotate, the inner ends of the axles terminating short of each other and being laterally deflected, said ends being free from a direct connection therebetween, a member pivotally supported intermediate its ends and disposed to one side of the first recited pivots, said member being laterally spaced from the deflected ends of the axles, and connections between the said member on opposite sides of the pivot thereof and the deflected portion of the respective axles.

5. Steering mechanism embodying steering wheels mounted to swing about separate upright pivots, axles about which the wheels rotate, the inner ends of the axles terminating short of each other and being laterally deflected, said deflected portions of the axles being free from a direct connection therebetween, a shifting element for moving the wheels about their pivots, and a toggle lever connection between each of said deflected portions of the axles and the said element.

6. Steering mechanism embodying steering wheels mounted to swing about separate upright pivots, a laterally deflected arm connected with each of the wheels, said arms being free from a direct connection therebetween, a member disposed to one side of and spaced from the wheel pivots, said member mounted to swing about a fixed upright pivot and a link connection between each of said laterally deflected arms and the said member and on opposite sides of the pivot of the member.

7. Steering mechanism embodying steering wheels mounted to swing about separate upright pivots, a laterally deflected arm connected with each of the wheels, said arms being free from a direct connection therebetween, a member disposed to one side of and spaced from the wheel pivots, said member mounted to swing about a fixed upright pivot, and a link connection between each of the said laterally deflected arms and the said member and on opposite sides of the pivot of the member, the portion of the connection between the pivot of each of the axles and the said member forming a toggle lever.

8. A steering mechanism embodying steering wheels mounted to swing about separate upright pivots, a laterally deflected arm connected with each of the wheels, said arms being free from a direct connection therebetween, a member disposed to one side of and spaced from the wheel pivots, said member mounted to swing about a fixed upright pivot, and a link pivotally connected with the said deflected arm and the said member between the pivots of the member and the wheel, the connection of the link with the member between the pivots of the wheel and member being maintained to one side of a straight line between said pivots.

9. Steering mechanism embodying steering wheels mounted to swing about separate upright pivots, a laterally deflected arm connected with each of the wheels, said arms being free from a direct connection therebetween, a member disposed to one side of and spaced from the wheel pivots, said member mounted to swing about a fixed upright pivot, and a link, the connection between the link and the deflected arm between the pivots of the said member and the wheel, being maintained to one side of a straight line between said pivots.

In testimony whereof I have signed my name to this specification, in the presence of two subscribing witnesses, on this 17th day of March A. D. 1916.

JOSEPH M. DENNING.

Witnesses:
H. A. HOFFERD,
A. H. DECKMAN.